United States Patent [19]

Rodgers, Jr.

[11] 4,222,725
[45] Sep. 16, 1980

[54] ELECTRO-HYDRAULIC RAM CONTROL APPARATUS

[75] Inventor: John L. Rodgers, Jr., Mound, Minn.

[73] Assignee: Solid Controls, Inc., Minneapolis, Minn.

[21] Appl. No.: 881,477

[22] Filed: Feb. 27, 1978

Related U.S. Application Data

[63] Continuation of Ser. No. 620,809, Oct. 8, 1975, abandoned.

[51] Int. Cl.³ .............................. B29F 1/00; B29F 1/06
[52] U.S. Cl. .................................... 425/145; 425/149
[58] Field of Search .............................. 425/145, 149

[56] References Cited

U.S. PATENT DOCUMENTS

| | | | |
|---|---|---|---|
| 3,456,298 | 7/1969 | Foster et al. | 425/149 |
| 3,726,334 | 4/1973 | Sallberg | 425/145 X |
| 3,860,801 | 1/1975 | Hunkar | 425/149 X |
| 3,870,445 | 3/1975 | Hold et al. | 425/149 X |
| 3,920,367 | 11/1975 | Ma et al. | 425/149 |
| 3,932,083 | 1/1976 | Boettner | 425/149 X |

*Primary Examiner*—Richard B. Lazarus
*Attorney, Agent, or Firm*—Warren A. Sturm

[57] ABSTRACT

A control system for the ram of a hydraulic injection molding press, the injection speed or velocity of which is to be precisely controlled according to a predetermined velocity command signal. A programmable relief valve is used to effect accurate control over the flow of hydraulic fluid under pressure to the ram cylinder and is responsive to signals representing diverse conditions of operation of the press.

In one application of the concept, velocity and subsequent holding pressure control of a ram are obtained.

3 Claims, 3 Drawing Figures

ELECTRO-HYDRAULIC RAM CONTROL APPARATUS

This is a continuation of application Ser. No. 620,809, filed Oct. 8, 1975, and now abandoned.

BACKGROUND OF THE INVENTION

1. Field of the Invention

This invention relates to electro-hydraulic servo controls and methods and apparatus for controlling the operation of a hydraulic injection molding press.

2. Description of the Prior Art

In the development of improved controls for injection molding presses, recent experience, i.e., within the last ten years or so, has included investigation into the possibility of utilizing a computer system to provide computer programmed servo loop controls for injection pressures, packing pressures and velocity of rams and the like that operated upon the "next cycle correction" whereby a computer would be used to analyze a cycle to determine if it did not meet the operating conditions as selected and programmed and, if so, a correction to the system would be entered for control of the next cycle. The capabilities of such computer operated control systems almost dictated from the start that the expense of the computer itself and of the ancillary equipment would be prohibitive and the slow response of the "next cycle correction" proved to be less desirable than a dynamic operation of a system operated in real time.

One of the important factors in controlling a hydraulic injection molding press is "fill time"; i.e., the time from the moment the injection starts until the time that the material is packed into the cavities in the mold. This is important because the otpimum condition for injecting a plasticized material into a mold is to fill all of the cavities in the mold while the material is still in a molten condition and will flow freely into each of the cavities. Failure to attain a proper "fill time", which is related to the velocity of the ram, may result in marks on the molded part, voids and nitt lines which may result in a weakening of the portions of the part to be molded. As one further example, the molding of parts to be subsequently plated, dictates that there be no flow lines, voids or nitts because these defects will not properly accept the plating material. As a result of the introduction of "exotic" molding materials as early as the mid-1960's, the "fill time" as determined by the velocity of the ram became more and more important. In fact, the most important of the factors which affect the injection cycle was determined to be the precise control over the "fill time".

However, the material viscosity varies from cycle to cycle dependent upon the nature of the raw material to be plasticized; i.e., the amount of regrind and moisture content. Any change in viscosity will also affect the "fill time". Therefore, injection under a constant pressure type of system, which was and is used on so-called standard machines, results in a variation in the fill time with changes in material viscosity. The only way to precisely control "fill time" is to insure that the conditions that are met as the ram performs its injecting cycle are constantly reproduced during each cycle so that you will always move from what is called shot size or "back" position to the forward or filled position in precisely the same amount of time; e.g., velocity control.

Attempts have been made to precisely control the "fill time" by controlling the velocity of the ram for every step of the way. That is, whether you have a constant or a variable velocity, such as a velocity profile, there must be control over the velocity for every step of the way. One way to accomplish this is to effect a dynamic control under a servo loop-type system which embodies feedback information to force a machine to respond as directed and with great repeatability. Experience with servo flow control valves has resulted in a relatively slow speed system which is unsuitable because, in some cases, the speed of the response of a system exceeds the time of an injection stroke with a resultant undesirable lack of control. Further development led to the use of a servo flow divider system which provided improved response to control signals but still not fast enough and the flow divider valve is not readily adaptable to systems having high hydraulic fluid flow rates. One other important limitation of servo type flow controls and flow dividers is a low tolerance for contamination in a hydraulic system so that a highly efficient filtration system is mandatory and such systems are prohibitively expensive as well as subject to malfunction. Further, many prior art hydraulic system of diverse nature have included the use of one or more adjustable or programmable pressure relief valves to operate as such; i.e., one or more different levels of pressure relief could be used during different cycles of operation. This may be seen in, for example, U.S. Pat. No. 3,932,083 in which a programmable relief valve is applied to an injection molding machine but is operated in an open loop condition and is not intended to be responsive to a dynamic velocity error signal to thereby control the pressure of fluid applied to the piston of a ram in an injection molding machine but only to provide a sufficiently high pressure to allow a flow control to be operable. A further prior art example may be seen in U.S. Pat. No. 3,721,512 in which a system embodies a pressure control valve as, for example, a throttle valve, is controlled by a signal representative of the melt temperature in an injection molding press.

Prior art apparatus has described a multitude of various and sundry ways of controlling the operation of a hydraulic injection molding press in accordance with many conditions which are sensed and used in a control. While past systems have been developed for accomplishing the general purpose of my invention, the systems known to be in existence have two common discrepancies. The first is that expense connected with developing and furnishing the systems has risen as an exponential function of the accuracy desired. Where expense has been a major consideration, the systems have lacked any usable degree of accuracy. Heretofore, the conventional method of controlling the velocity of a machine was by means of a hydraulic flow control valve. This means was not satisfactory because of slow response. An improved means was developed using a hydraulic servo valve. Although this improved the speed of response, it did so at a great increase in expense through greater cost of the servo valve and to the high cost of oil filtration required by the valve.

SUMMARY OF THE INVENTION

In carrying out the principles of my invention, one element may be seen to be common to all possible uses; that is the application of a pressure control valve that is programmable in accordance with one or more of a number of signals representative of sensed conditions, to control the application of hydraulic fluid under pressure to the hydraulic means for injecting the material from a conditioner or a transfer pot into the mold of an electro-hydraulic injection molding press.

This basic circuit is applicable whether or not the overall apparatus is in one or the other of several modes of operation which may be, for example, a velocity control of the ram, a condition coinciding with the pressure of the fluid applied to drive the ram or the pressure of the material in the mold itself.

In one embodiment of my invention, a vastly improved dynamic velocity control system utilizing a variably controllable pressure relief valve is operated in accordance with an error signal derived from a source of velocity command signal which may be variable in nature, and the actual velocity of the ram as may be determined by differentiating an analog position signal from a source normally found on such hydraulic injection molding presses to provide an unexpected improvement in response time, and precise, real time control over the injection portion of the cycle of such apparatus; without necessitating flow control of hydraulic fluid from the pump to the ram cylinder.

I have also discovered that there are additional, heretofore unknown, principles of operation which may readily utilize the concept of that portion of my invention described above for determining the prior time to change from one mode of operation to another.

DESCRIPTION OF THE ILLUSTRATED EMBODIMENTS

Figure 1:
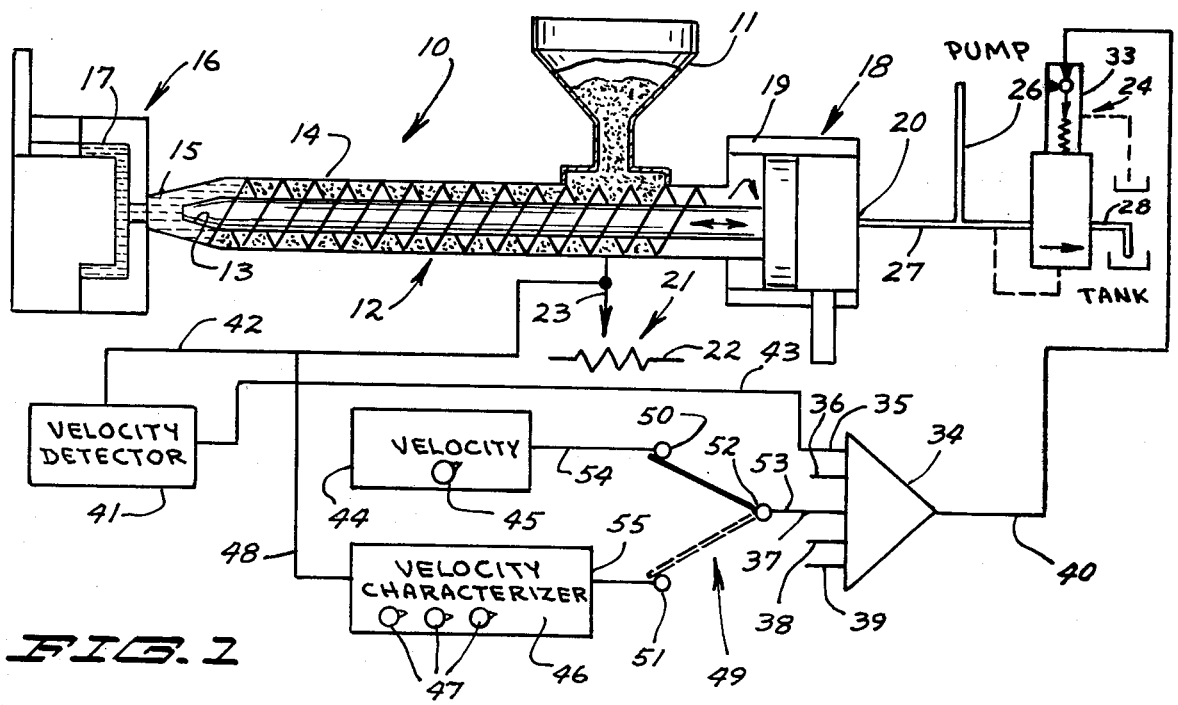
FIG. 1 is an application of my novel and improved control system to a pictorial representation of the essential elements of an electro-hydraulic injection molding press in which schematic and diagrammatic representations of the entire system are shown.
Figure 2:
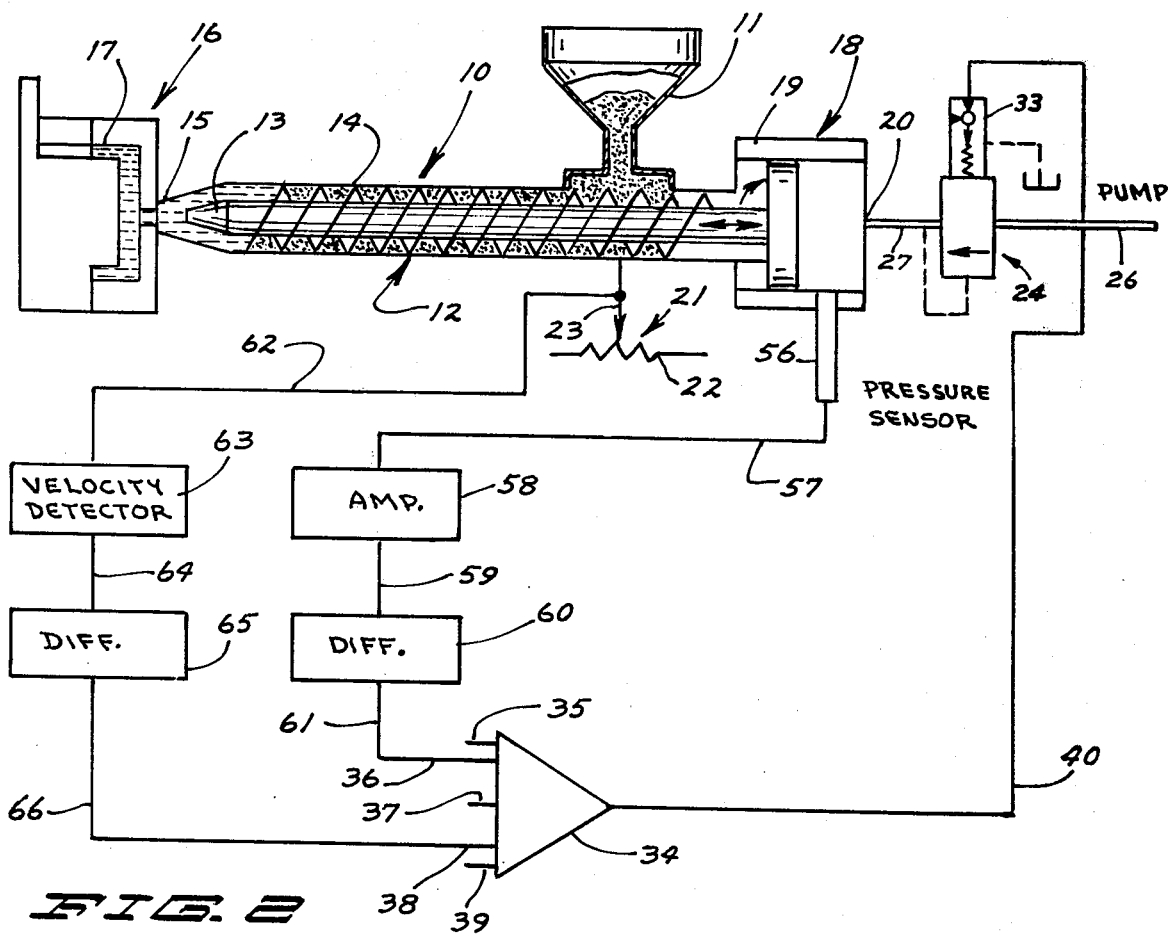
FIG. 2 is a similar form of electro-hydraulic injection molding press showing a modification in the use of my invention in block schematic and diagrammatic form.

Referring now to FIGS. 1 and 2 of the drawings, it will be seen that an electro-hydraulic injection molding press is indicated generally by reference character 10 which includes a source of material 11 that is connected to a plastic conditioner 12 having a rotating screw and ram 13 rotatably disposed within a barrel 14 and terminates in a nozzle 15 at the left end. A mold 16, having a separable cavity and sprue, is shown in operative engagement with nozzle 15.

A hydraulic motor, shown in the form of a hydraulic cylinder and piston, indicated generally by reference character 18, is shown disposed on the right end of ram 13 and includes a cylinder 19 and an inlet port 20.

A position sensing means is indicated by reference character 21 and is shown adapted to sense the position of ram 13 and includes a stationary potentiometer winding 22 which may be energized from a suitable source of electric current (not shown), and a wiper 23.

In FIG. 1, pressure control valve 24 shown as a relief valve, is connected to inlet port 20 in hydraulic cylinder 19 through conduit 27 which is also connected to a pump (not shown) through a further conduit 26. Pressure control valve 24 also includes a pilot relief control unit 33 connected to conductor 40, and an outlet 28 which is shown disposed over a tank therefor.

In FIG. 2, a pressure control valve 24, shown as a pressure reducing valve, is connected to inlet port 20 in hydraulic cylinder 19 through conduit 27. An inlet port is connected to a pump through conduit 26. Valve 24 also includes a pilot relief control unit 33 connected to conductor 40.

The configurations of the two versions of pressure control valves of FIGS. 1 and 2 may be recognized as standard symbols customarily used in the hydraulics industry.

Signal combiner 34 also includes a plurality of input terminals 35, 36, 37, 38 and 39 for purposes to be described below.

Referring specifically to FIG. 1, signal combiner 34 is shown having input terminal 35 connected to wiper 23 on potentiometer 21 through conductor 43, velocity detector 41 (which may be a suitable differentiation device) and conductor 42. Input terminal 37 on signal comparator 34 is connected to a movable contact 52 on switch 49 through conductor 53. Stationary contact 50 on switch 49 is connected to a velocity command means 44 having a knob 45 for adjusting the command signal, through conductor 54. Stationary contact 51 is connected to potentiometer winding 23 through conductor 55, velocity characterizer 46, having a plurality of input adjusters 47, and conductor 48 and conductor 42.

In FIG. 2 of the drawings, input terminal 36 on signal comparactor 34 is shown connected to a pressure sensor 56 connected to sense the pressure within the interior of cylinder 19 and to provide an electrical signal through conductor 57 to amplifier 58, through conductor 59 to differentiating means 60 and to terminal 36 through conductor 61. Terminal 38 on signal combining means 34 is connected to wiper 23 on potentiometer 21 through conductor 62, velocity detector 63, conductor 64, differentiating means 65 and conductor 66.

Figure 3:
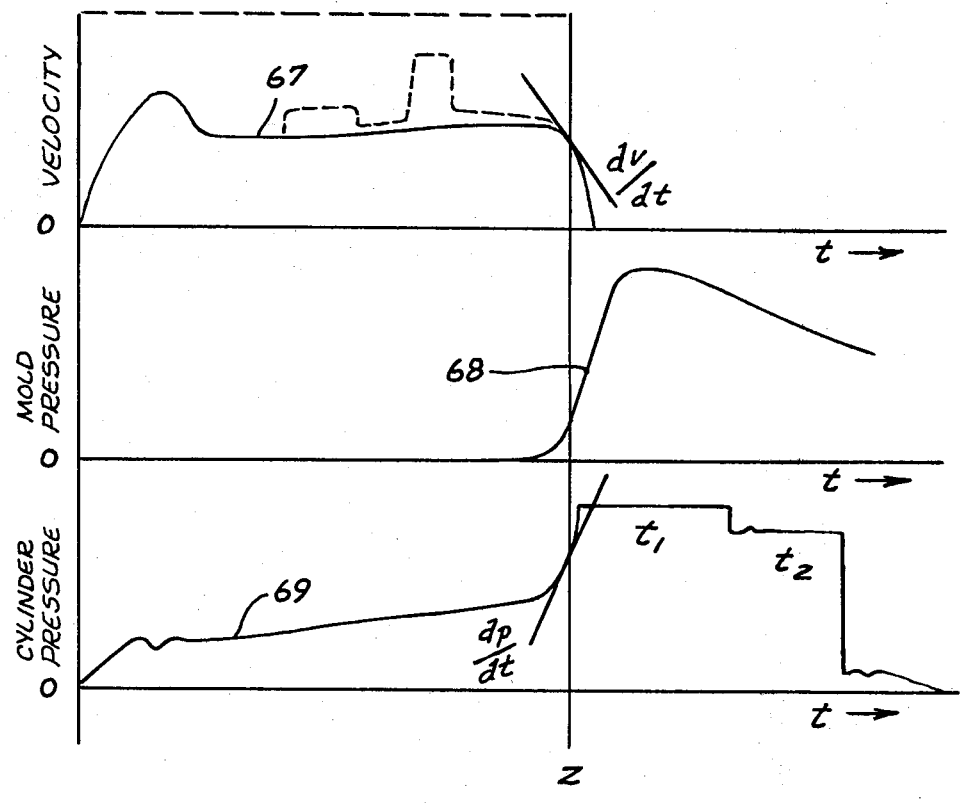
FIG. 3 shows representative curves of the events occurring over one timed cycle of operation of my apparatus.

Referring to FIG. 3, the curves illustrate various conditions sensed during the operation of the described embodiments.

OPERATION

Referring to FIG. 1, it may be seen that apparatus under consideration provides operation of the ram on the injection portion of the cycle of an electro-hydraulic injection molding machine such that the pump or sources of hydraulic fluid under pressure is connected directly to the right end of cylinder 19 and against the piston formed at the right end of ram 13. The output of signal comparator 34 is connected to energize electric to hydraulic transducer 33, shown as a pilot valve, in accordance with the inputs supplied thereto by comparing the velocity of ram 13 with a command signal which may be a constant value as determined by signal generator 44 or characterized in accordance with the position of ram 13 by velocity characterizer 46. In any event, the actual velocity at input terminal 35 is compared with the desired velocity on input terminal 37 to provide a signal of magnitude which will control the operation of pressure relief valve 24 through the transducer 33 so that the desired velocity is attained.

Referring to FIG. 2, the embodiment illustrated utilizes the same form of operation of a pressure control valve, shown as pressure reducing valve 24. However, the input terminals 36 and 38 on signal comparator 34 receive signals proportional to the rate of change of velocity of ram 13 as well as the rate of change of pressure on the hydraulic fluid within the right end of cylinder 19. At the appropriate desired magnitude of the rate of change of the two signals, the operation of the velocity control system shown in FIG. 1 may be terminated and other appropriate signals, such as one related to the pressure within the right end of cylinder 19, a predetermined desired value or a signal representative of the pressure of the material within mold cavity and screw 17 may be substituted.

Curves 67, 68 and 69 in FIG. 3 illustrate the relationship of a typical system employing the principles of my invention wherein curve 67 represents a typical velocity having a constant velocity element and a further curve in dotted form to show a characterized velocity function and includes a sloped line tangent to the curve as a velocity decreases as it approaches filling of the mold cavity 17 indicated by dv/dt, the rate of change of velocity. Curve 68 illustrates a typical pressure pattern existing within mold cavity 17 which will be seen to be essentially zero until the ram nears the end of its stroke to completely fill the mold cavity, the pressure continuing to build up as the ram is stopped, as indicated by time base line Z and maintains a fairly constant value until it drops off as the material within the mold starts to shrink upon the completion of the cure cycle. Curve 69 represents the hydraulic pressure within the right end of cylinder 19 which, it will be seen, raises from a low value generally as the velocity increases and then gradually increases to a point near the end of filling of the ram as indicated by time base line Z, at which point it rises rapidly to a higher value and holds for a time T1, followed by a second interval of slightly lower value for a timed interval T2 and then gradually returns to zero. The line tangent to the pressure curve 69 near line Z represents the rate of change of pressure and is indicated by dp/dt.

As may now be seen, the operation of FIG. 2 of the illustrated embodiment is directly proportional to the slope of the lines tangent to the velocity and pressure curves 67 and 69 and may be used to provide a switchover for signal combiner-comparator-amplifier 34 to still another signal applied to one of its inputs to maintain a pressure applied to the right end of ram 13 to sufficiently carry out the entire cycle.

I claim:

1. In combination, a hydraulic injection molding press of the class having a hydraulically actuated cylinder connected to a ram for transferring molding material from a chamber into a mold and including a source of pressurized hydraulic fluid having a pressure relief valve and connected directly to the cylinder, and a controller for controlling operation of the molding press, the controller comprising
    (a) a controllable transducer operating the pressure relief valve to control hydraulic fluid pressure in the cylinder;
    (b) ram velocity control means comprising means sensing the velocity of the ram as it moves in an injection stroke and means comparing the sensed velocity with a preset velocity and producing a deviation signal controlling the pressure relief valve transducer to thereby control the ram velocity;
    (c) holding pressure control means comprising sensing means sensing the hydraulic cylinder pressure, means comparing the sensed pressure with a preset value and producing a deviation signal controlling the pressure relief valve transducer to control the hydraulic cylinder pressure; and
    (d) sensing and switching means sensing when a mold has been substantially filled with molding material and responsively switching control of the pressure relief valve transducer from the velocity control means to the pressure control means.

2. The combination of claim 1 in which the sensing and switching means includes means responsive to mold pressure for switching control of the pressure relief valve transducer from the velocity control means to the pressure control means when the mold pressure has increased to a preset value.

3. In combination, a hydraulic injection molding press of the class having a hydraulically actuated cylinder connected to a ram for transferring molding material from a chamber into a mold and including a source of pressurized hydraulic fluid having a pressure relief valve and connected directly to the cylinder, and a controller controlling operation of the molding press, the controller comprising
    (a) a controllable transducer operating the pressure relief valve to control hydraulic fluid pressure in the cylinder;
    (b) ram velocity control means comprising means sensing the velocity of the ram as it moves in an injection stroke and means comparing the sensed velocity with a preset velocity and producing a deviation signal controlling the pressure relief valve transducer to thereby control the ram velocity;
    (c) holding pressure control means comprising sensing means sensing the hydraulic cylinder pressure, means comparing the sensed pressure with a preset value and producing a deviation signal controlling the pressure relif valve transducer to control the hydraulic cylinder pressure; and
    (d) switching means responsive to the cylinder pressure sensing means switching control of the pressure relief valve transducer from the velocity control means to the pressure control means when the cylinder pressure has attained a preset value.

* * * * *